(12) United States Patent
Jordan, Jr.

(10) Patent No.: US 6,941,126 B1
(45) Date of Patent: Sep. 6, 2005

(54) WIRELESS WEATHER ALERTS

(75) Inventor: Royce D. Jordan, Jr., Lawrenceville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 450 days.

(21) Appl. No.: 10/097,309

(22) Filed: Mar. 14, 2002

Related U.S. Application Data

(60) Provisional application No. 60/339,974, filed on Dec. 10, 2001.

(51) Int. Cl.[7] .............................................. H04M 11/00
(52) U.S. Cl. ............................. 455/404.1; 455/412.1; 455/414.1; 455/422; 455/445; 455/466; 340/7.48; 340/7.5
(58) Field of Search ...................... 455/404.1, 404.2, 455/412.1, 412.2, 414.1, 414.2, 422.1, 414.3, 455/432.3, 445, 466, 3.01, 560; 340/7.48, 340/7.5, 7.29, 7.25

(56) References Cited

U.S. PATENT DOCUMENTS

| | | | |
|---|---|---|---|
| 5,559,800 A | | 9/1996 | Mousseau et al. |
| 5,772,459 A | * | 6/1998 | Swart .......................... 439/341 |
| 6,219,694 B1 | | 4/2001 | Lazaridis et al. |
| 6,505,123 B1 | | 1/2003 | Root et al. |
| 6,725,048 B2 | * | 4/2004 | Mao et al. .................. 455/458 |
| 2002/0058520 A1 | * | 5/2002 | Nakagawa .................. 455/456 |
| 2002/0090976 A1 | * | 7/2002 | Chatain ....................... 455/556 |

* cited by examiner

*Primary Examiner*—Lee Nguyen
*Assistant Examiner*—Minh D. Dao
(74) *Attorney, Agent, or Firm*—Cantor Colburn LLP

(57) ABSTRACT

A method of delivering weather information to a wireless device. The method includes obtaining weather information from a weather information server, obtaining a subset of the weather information from the weather information, and sending the subset of the weather information to the wireless device.

19 Claims, 5 Drawing Sheets

FIG. 4

WWUS41 KCTP 070247
WSWCTP

URGENT – WINTER WEATHER MESSAGE
NATIONAL WEATHER SERVICE STATE COLLEGE, PA
9:45 PM EST. WED., FEB. 6, 2002

A LOW PRESSURE SYSTEM WILL MOVE NORTHEAST FROM THE GULF
COAST STATES OVERNIGHT. LIGHT PRECIPITATION ALONG THE NORTHERN
EDGE OF THIS SYSTEM WILL AFFECT PARTS OF SOUTHERN PENNSYLVANIA
STARTING BEFORE SUNRISE THURSDAY. TEMPERATURES NEAR FREEZING
WILL CAUSE PRECIPITATION TO BE A MIXTURE OF LIGHT SNOW AND LIGHT
FREEZING RAIN OR FREEZING DRIZZLE.

*PAZ036-064>066-070935-*
ADAMS, PA – FRANKLIN, PA – LANCASTER, PA – YORK, PA –
9:45 PM EST. WED., FEB. 6, 2002

...A WINTER WEATHER ADVISORY IS IN EFFECT FOR THURSDAY MORNING
FOR A MIXTURE OF LIGHT SNOW AND LIGHT FREEZING RAIN...

A LOW PRESSURE SYSTEM WILL MOVE NORTHEAST FROM THE GULF
COAST STATES OVERNIGHT. LIGHT SNOW ALONG THE NORTHERN EDGE OF
THE SYSTEM WILL SPREAD INTO SOUTHERN PENNSYLVANIA DURING THE
PREDAWN HOURS THURSDAY. TEMPERATURES ALOFT WILL BE NEAR... OR
SLIGHTLY ABOVE FREEZING EARLY THURSDAY MORNING...POSSIBLY
CAUSING PRECIPITATION TO FALL AS LIGHT FREEZING RAIN FOR A PERIOD
OF TIME. TEMPERATURES WILL CONTINUE TO WARM UP...AND CHANGE
ANY LINGERING PRECIPITATION TO ALL RAIN LATER THURSDAY MORNING.
THE PRECIPITATION SHOULD END BY EARLY AFTERNOON.

ALLOW A LITTLE EXTRA TIME FOR YOUR MORNING COMMUTE TO WORK
AND SCHOOL...SINCE LIGHT FREEZING RAIN MAY CAUSE SOME ROADS TO
HAVE A VERY THIN LAYER OF ICE.

A WINTER WEATHER ADVISORY IS ISSUED WHEN SNOW OR ICE IS
FORECAST TO DEVELOP IN THE AFFECTED AREAS...BUT ACCUMULATIONS
ARE EXPECTED TO BE LIGHT. EVEN A SMALL ACCUMULATION OF SNOW OR
ICE CAN MAKE DRIVING AND WALKING DIFFICULT ON UNTREATED
ROADWAYS AND SIDEWALKS. WHEN TEMPERATURES ARE BELOW
FREEZING...MOTORISTS NEED TO BE ESPECIALLY CAREFUL ON BRIDGES
AND OVERPASSES WHERE SLIPPERY SPOTS CAN EASILY DEVELOP.

STAY TUNED TO NOAA WEATHER RADIO AND OTHER LOCAL MEDIA FOR
FURTHER DETAILS OR UPDATES.

$$

LAMBERT/RADZANOWSKI/BROLLEY

```
</PRE></TT></td>

<td width="34%" bgcolor="#FF0000"> </td>

</tr></table>

<table border="1" width="100%" bordercolor="#FFFFFF">

<tr>

<td width="33%" bgcolor="#FF0000"> </td>

<td nowrap bgcolor="FFFFFF" bordercolor="#000000">

<TT><PRE>WWUS41 KCTP 070247
WSWCTP
```

URGENT – WINTER WEATHER MESSAGE
NATIONAL WEATHER SERVICE STATE COLLEGE, PA
9:45 PM EST. WED., FEB. 6, 2002

A LOW PRESSURE SYSTEM WILL MOVE NORTHEAST FROM THE GULF COAST STATES OVERNIGHT. LIGHT PRECIPITATION ALONG THE NORTHERN EDGE OF THIS SYSTEM WILL AFFECT PARTS OF SOUTHERN PENNSYLVANIA STARTING BEFORE SUNRISE THURSDAY. TEMPERATURES NEAR FREEZING WILL CAUSE PRECIPITATION TO BE A MIXTURE OF LIGHT SNOW AND LIGHT FREEZING RAIN OR FREEZING DRIZZLE.

*PAZ036-064>066-070935-*
ADAMS, PA – FRANKLIN, PA – LANCASTER, PA – YORK, PA –
9:45 PM EST. WED., FEB. 6, 2002

...A WINTER WEATHER ADVISORY IS IN EFFECT FOR THURSDAY MORNING FOR A MIXTURE OF LIGHT SNOW AND LIGHT FREEZING RAIN...

A LOW PRESSURE SYSTEM WILL MOVE NORTHEAST FROM THE GULF COAST STATES OVERNIGHT. LIGHT SNOW ALONG THE NORTHERN EDGE OF THE SYSTEM WILL SPREAD INTO SOUTHERN PENNSYLVANIA DURING THE PREDAWN HOURS THURSDAY. TEMPERATURES ALOFT WILL BE NEAR... OR SLIGHTLY ABOVE FREEZING EARLY THURSDAY MORNING...POSSIBLY CAUSING PRECIPITATION TO FALL AS LIGHT FREEZING RAIN FOR A PERIOD OF TIME. TEMPERATURES WILL CONTINUE TO WARM UP...AND CHANGE ANY LINGERING PRECIPITATION TO ALL RAIN LATER THURSDAY MORNING. THE PRECIPITATION SHOULD END BY EARLY AFTERNOON.

ALLOW A LITTLE EXTRA TIME FOR YOUR MORNING COMMUTE TO WORK AND SCHOOL...SINCE LIGHT FREEZING RAIN MAY CAUSE SOME ROADS TO HAVE A VERY THIN LAYER OF ICE.

A WINTER WEATHER ADVISORY IS ISSUED WHEN SNOW OR ICE IS FORECAST TO DEVELOP IN THE AFFECTED AREAS...BUT ACCUMULATIONS ARE EXPECTED TO BE LIGHT. EVEN A SMALL ACCUMULATION OF SNOW OR ICE CAN MAKE DRIVING AND WALKING DIFFICULT ON UNTREATED ROADWAYS AND SIDEWALKS. WHEN TEMPERATURES ARE BELOW FREEZING...MOTORISTS NEED TO BE ESPECIALLY CAREFUL ON BRIDGES AND OVERPASSES WHERE SLIPPERY SPOTS CAN EASILY DEVELOP.

STAY TUNED TO NOAA WEATHER RADIO AND OTHER LOCAL MEDIA FOR FURTHER DETAILS OR UPDATES.

$$

LAMBERT/RADZANOWSKI/BROLLEY

WIRELESS WEATHER ALERTS

CROSS REFERENCE TO RELATED APPLICATION

This application claims priority under 35 U.S.C. § 119(e) to U.S. Provisional Application Ser. No. 60/339,974 filed Dec. 10, 2001.

BACKGROUND OF THE INVENTION

Wireless devices have become increasingly prevalent in society. Devices are often used for one-way or two-way communications. However, wireless devices also have found utility as information gathering devices. For example, wireless devices can be used to access the Internet. However, wireless devices have not been utilized to provide real-time information relating to information that is only useful when conveyed in real-time. For example, weather alerts in the form of, for example, severe weather warnings or watches are issued by weather services such as the United States National Weather Service. If such alerts are not received in real-time, they are not helpful to persons who may need to evacuate or take precautions. Thus, there is a need to provide the capability to transmit weather alerts, in real-time, to a wireless device.

SUMMARY OF THE INVENTION

In one embodiment, the present invention is directed to a method of delivering weather information to a wireless device. The method includes obtaining weather information from a weather information server, obtaining a subset of the weather information from the weather information, and sending the subset of the weather information to the wireless device.

The present invention is also directed, in another embodiment, to a wireless gateway. The gateway includes a database having stored therein user information and a router in communication with the database. The gateway obtains weather information from a weather information server, obtains a subset of the weather information from the weather information, and sends the subset of the weather information to a wireless device.

The present invention is also directed, in another embodiment, to a system. The system includes a mobile switching center, a gateway in communication with the mobile switching center, and a weather information server in communication with the gateway. The gateway obtains weather information from the weather information server, obtains a subset of the weather information from the weather information, and sends the subset of the weather information to a wireless device.

BRIEF DESCRIPTION OF THE DRAWINGS

Further advantages of the present invention may be better understood by referring to the following description taken in conjunction with the accompanying drawings, in which:

FIG. 4 is an example of weather information that may be accessed using the present invention; and FIG. 5 is an example of the source markup language of the information of FIG. 4.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, other elements of a conventional telecommunications network. For example, certain network details and modules of certain messaging platforms are not described herein. Those of ordinary skill in the art will recognize, however, that these and other elements may be desirable in a typical communications network. However, because such elements are well known in the art, and because they do not facilitate a better understanding of the present invention, a discussion of such elements is not provided herein.

The present invention relates to an interactive wireless communications system in which a wireless device user can receive weather information automatically from a wireless network. The present invention employs a wireless gateway to control selection and dissemination of the weather information. As used herein, the terms "weather warning" or "warning" refer to weather information that may include warnings and/or watches relating to the weather conditions at a particular geographical area.

Figure 1:
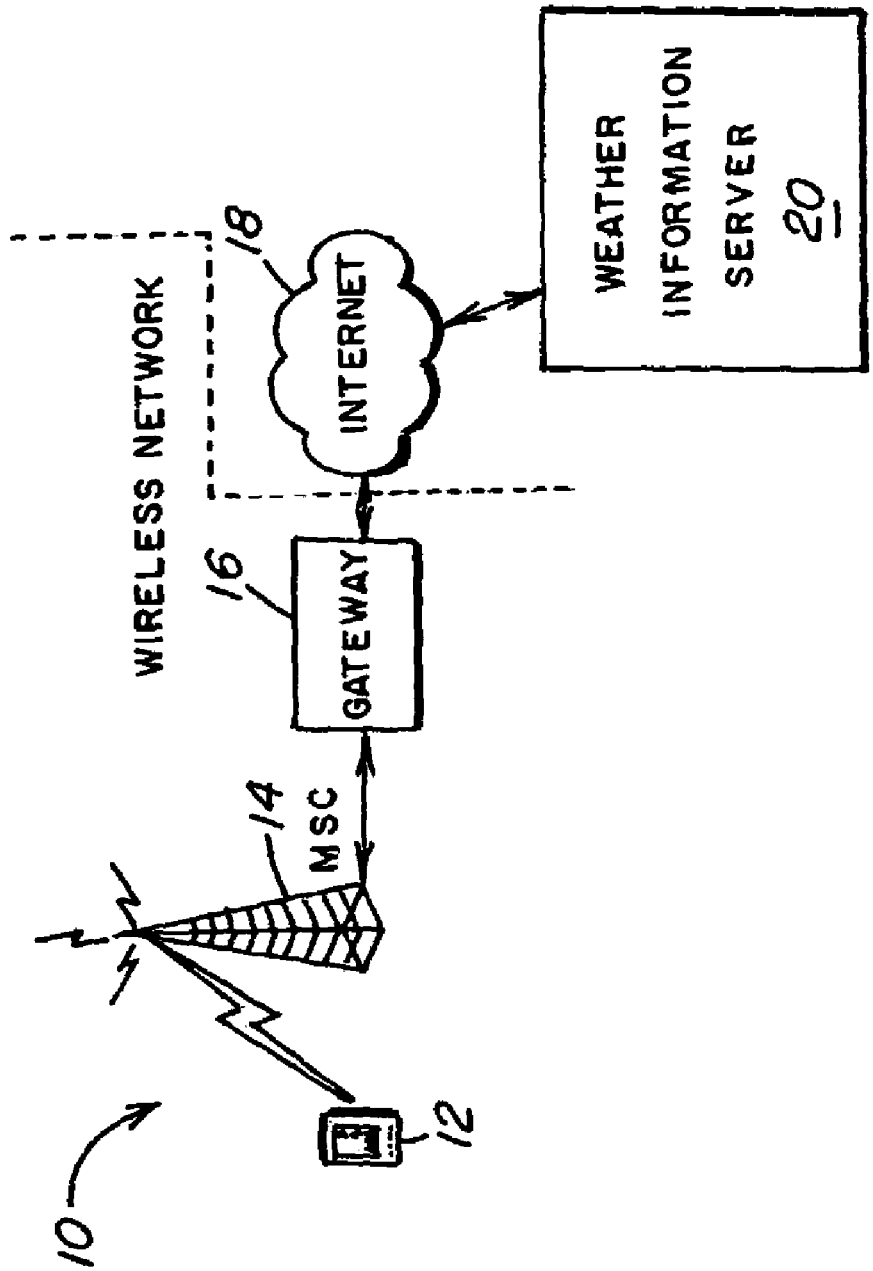
FIG. 1 is a simplified block diagram of a system according to one embodiment of the present invention.

FIG. 1 is a simplified schematic diagram of a system 10 according to one embodiment of the present invention. The system 10 includes a wireless device 12, a mobile switching center (MSC) 14, a wireless gateway 16, an intermediate network 18 (such as the Internet), and a weather information server 20. The wireless device 12 may be any wireless digital processor capable of accessing the Internet such as, for example, a mobile telephone, a personal digital assistant, or a pager such as those sold by Research in Motion (RIM) Inc.

The mobile switching center 14 may comprise any one of a number of known communications switching devices, including those commonly used and known in the art for providing either digital or analog cellular telephone service to a plurality of wireless devices 12. The mobile switching center 14 performs switching functions to permit communication between the intermediate network 18 and the wireless device 12. Although only one mobile switching center 14 is shown, it will be understood that the system 10 may include more.

The wireless gateway 16 refers to a software infrastructure that connects the wireless domain (i.e. wireless device 12 and MSC 14) with the intermediate network 18. Each network in FIG. 1 may be running a different protocol. Message transfer among users that communicate with different protocols may be routed through a network gateway processor that transforms the message from the foreign protocol to the native protocol. Thus, gateways that are used for message transfer among interconnected networks, such as over what is commonly referred to as the "Internet," accept e-mail messages from other gateways and from connected networks.

In that regard, the wireless gateway 16 carries out protocol conversions between, for example, wireless access protocol (WAP) communication protocols and Internet communication protocols (e.g. HTTP, TCP/IP). The underlying protocol for packaging and decoding messages sent by the wireless device 12 and received by the gateway 16 may be, for example, Simple Mail Transport Protocol (SMTP). The gateway 16 also performs content encoding, such as encoding of wireless markup language (WML) into binary format and compilation of WMLScripts. Gateway 16 may reside within the wireless carrier's network but may also reside within a corporate business environment.

The weather information server 20 may be, for example, a web server that serves weather-related information via the network 18. The weather information may include, for example, weather-related warnings. The warnings may be, for example, flood warnings, special marine warnings, non-precipitation warnings, winter storm warnings, tornado warnings, hurricane warnings, severe thunderstorm warnings, coastal flood warnings, or flash flood warnings. An example of the server 20 is a server maintained by the National Weather Service as found at www.nws.noaa.gov.

Figure 2:
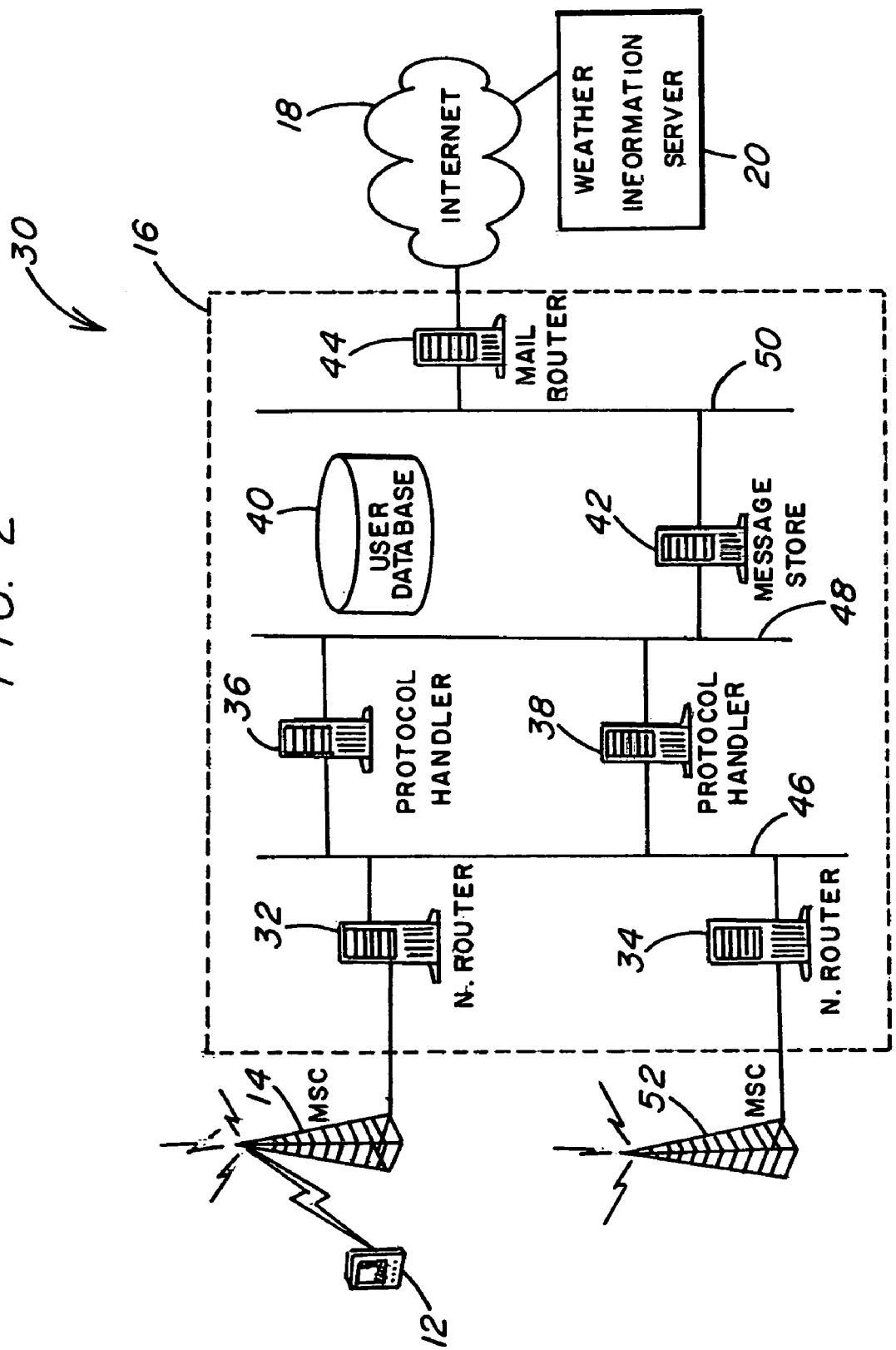
FIG. 2 is a simplified block diagram illustrating elements of the wireless gateway of FIG. 1.

FIG. 2 shows a more detailed schematic of a wireless network 30, and especially the gateway 16, according to one embodiment of the present invention. The network 30 includes wireless device 12, MSC 14, Nrouters 32 and 34, protocol handlers 36 and 38, a user database 40, a message store 42, and a mail router 44. Wireless network 30 may use, for example, Mobitex® technology of the Cingular Interactive Intelligent Wireless Network service provided by Cingular Wireless. The Mobitex® network is a two-way wireless data service that can be connected with other complementary networks. A wireless data service such as the Mobitex® network includes a hierarchy of communications systems that can provide nationwide wireless service through a network of base stations and local switches under the control of higher order regional switches or exchanges.

The components of the gateway 16 may be connected over an internal network 46, 48, and 50, which may be a local area network (LAN). One or more wireless network exchanges such as Mobitex® regional switches 14 and 52, which may reside at separate locations, communicate with the gateway 16 through Nrouters 32 and 34. The communication between regional switch 14 and the Nrouters 32, 34 may use, for example, an X.25 protocol. Nrouters 32 and 34, in turn, communicate with protocol handlers 36 and 38 over internal network 46 using, for example, X-sockets.

Protocol handlers 36, 38 use data from user database machine 40 to communicate externally to gateway 16 via network 50. The mail router 44 is connected to internal network 50 and handles inbound and outbound communications traffic with an external network such as the Internet 18, as well as X-sockets traffic. If necessary, a separate X-sockets machine and backup machine (not shown) can be added.

Protocol handlers 36 and 38 process information contained in user database machines, such as user database 40. Additionally, each protocol handler maintains a database cache, i.e., a small, fast memory holding recently accessed data, to speed up internal network communications and to limit database access requests over the LAN. The protocols handled by protocol handlers 36, 38 specify that message storage and internal email access may be handled by the UNIX standard Network File System (NFS) distributed file system from SUNSOFT, which allows data to be shared across the network regardless of the protocol.

The message store 42 is responsible for, among other things, delivering a mail message to a recipient or receiving a mail message from a sender. Thus, the message store 42 may contain various routing and delivery program modules necessary to ensure that a mail message is either delivered to a recipient, or forwarded to other components for delivery to a recipient.

Figure 3:
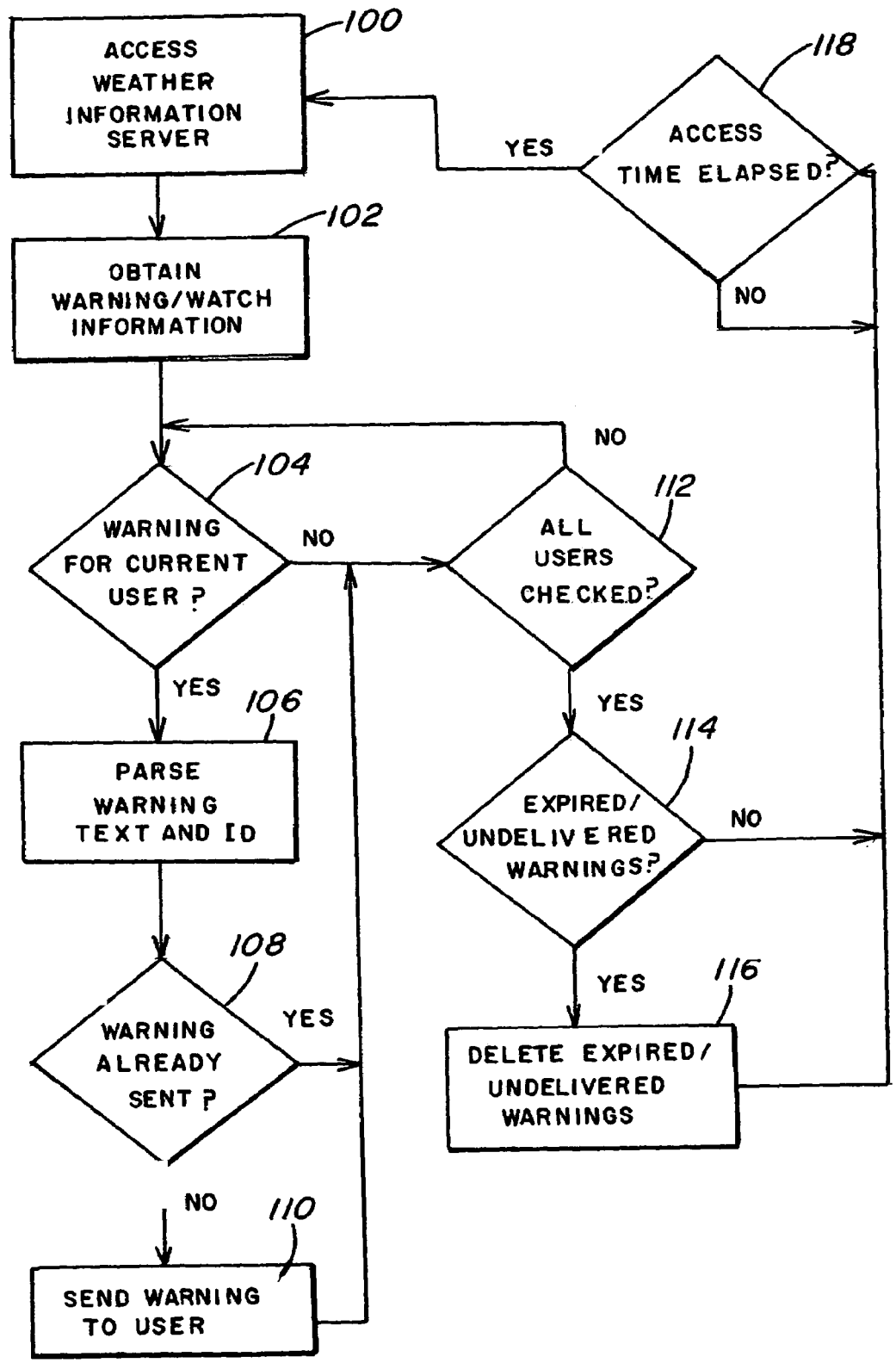
FIG. 3 is a flowchart of a process for providing wireless weather information according to one embodiment of the present invention.

FIG. 3 is a flowchart of a process for providing wireless weather information according to one embodiment of the present invention. The process described in connection with FIG. 3 may be implemented on the gateway 16 using, for example, software coded in, for example, the C, C++, or Java computer languages. Such software may be embodied in a computer-readable medium such as, for example, a floppy diskette, a compact disc (CD), a magnetic tape cartridge, or any suitable magnetic/electromagnetic storage medium. At step 100, the gateway 16 accesses the weather information server 20. At step 102, the weather information is obtained from the server 20. At step 104, the gateway 16 determines whether the weather information contains any warnings relating to a user that has, for example, specified that they want weather warnings for a specific geographical area or areas to be relayed to them. The gateway 16 may determine whether a warning relates to a user by, for example, first retrieving user information relating to the user (e.g. a weather warning profile) from the user database 40. Such user information may include, for example, the identity of the user, the wireless device address of the user's device 12, and the geographical area or areas for which the user wants weather warning information. The gateway 16 may then search the weather information to determine if any weather warnings relate to the geographical area or areas that the user has specified.

If a warning relates to the user, the warning text and an identifying string are parsed from the information at step 106. The warning (i.e. a subset of the weather information) may be delineated from other portions of the information, and thus parsed, based on separators in the text or source language of the information. At step 108, the gateway 16 checks to see if, based on the identifying string, the warning has already been sent to the user. Such a check avoids the transmission of duplicate warnings to a user. If the warning has not been previously sent to the user, the warning is sent to the user at step 110. The process then advances to step 112, where the gateway 16 determines if the weather information has been checked for all users that have asked to be informed of weather warnings. Likewise, the process advances to step 112 if it was determined that there are no warnings relating to the user as determined at step 104 or if it is determined that the warning was already sent at step 108.

If the weather information has not been checked for all users that have asked to be informed of weather information, the process advances to step 104 to check for warnings for another user. If there are no further users for which weather information needs to be checked, the process proceeds to step 114, where the gateway 16 determines if there are any warnings that have not been delivered to a user and that have expired. If a user's wireless device 12 is not active on the wireless network 10 (i.e. it is off the air) and a warning was sent to the wireless device 12, the wireless device 12 will not receive the warning. Thus, at step 114, the gateway 16 checks the text of all undelivered warnings to determine if each of the undelivered warnings (if any) has expired.

If there are undelivered and expired warnings as determined at step 114, such warnings are deleted so that they will not be delivered to the wireless device 12 when the user activates the device on the network 10. The process then advances to step 118. Likewise, if there are no undelivered and expired warnings as determined at step 114, the process advances to step 118.

Alternatively, instead of checking for undelivered and expired warnings, the gateway may place an expiration date and time on the message containing the warning. The message would thus expire without intervention by the gateway 16.

The gateway 16 can be configured to access the weather information server 20 at periodic intervals such as, for example, every 5 minutes. At step 118, the gateway 16 determines if the periodic interval has elapsed. If the interval has not elapsed, the process stays at step 118 until the interval has elapsed, at which time the process returns to step 100 to access the weather information server 20.

FIG. 4 is an example of weather information that may be obtained from the weather information server 20 at step 102 of FIG. 3. As can be seen in FIG. 4, the weather information indicates a winter weather advisory for various counties in Pennsylvania. Thus, if a user of a wireless device 12 requested weather information relating to one or all of those counties, the gateway 16 would deliver the text or a portion of the text of the weather information to the wireless device 12 as, for example, a text message. FIG. 5 is an example of the source markup language (HTML) of the weather information of FIG. 4.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method of delivering weather information to a wireless device, comprising:
   obtaining weather information from a weather information server;
   obtaining a subset of the weather information from the weather information;
   sending the subset of the weather information to the wireless device;
   determining whether any previously sent and expired weather information has been undelivered to the wireless device; and
   deleting the undelivered weather information.

2. The method of claim 1, further comprising determining whether any of the weather information is relevant to a user of the wireless device.

3. The method of claim 1, further comprising determining if the subset of the weather information was already sent to the wireless device prior to sending the subset of the weather information to the wireless device.

4. The method of claim 1, wherein obtaining weather information from a weather information server includes obtaining weather information at periodic intervals.

5. The method of claim 1, wherein obtaining a subset of the weather information from the weather information includes parsing a weather warning from the weather information.

6. The method of claim 1, wherein obtaining weather information from a weather information server includes obtaining weather information from a weather information server via the Internet.

7. A wireless gateway, comprising:
   a database having stored therein user information; and
   a router in communication with the database;
   wherein the gateway obtains weather information from a weather information server, obtains a subset of the weather information from the weather information, sends the subset of the weather information to a wireless device, determines whether any previously sent and expired weather information has been undelivered to the wireless device, and deletes the undelivered weather information.

8. The gateway of claim 7, further comprising a message store in communication with the database and the router.

9. The gateway of claim 7, wherein the user information includes weather warning profile information relating to at least one user.

10. The gateway of claim 9, wherein the weather warning profile information includes a warning type and a geographical area.

11. The gateway of claim 7, wherein the router is a mail router.

12. A system, comprising:
   a mobile switching center;
   a gateway in communication with the mobile switching center; and
   a weather information server in communication with the gateway;
   wherein the gateway obtains weather information from the weather information server, obtains a subset of the weather information from the weather information, sends the subset of the weather information to a wireless device, determines whether any previously sent and expired weather information has been undelivered to the wireless device, and deletes the undelivered weather information.

13. The system of claim 12, wherein the weather information server is in communication with the gateway via the Internet.

14. The system of claim 12, wherein the weather information server includes a web server.

15. The system of claim 12, wherein the gateway includes a database having weather warning profile information relating to at least one user.

16. The system of claim 12, wherein the gateway includes a mail router.

17. The system of claim 12, wherein the gateway includes a message store.

18. A wireless gateway, comprising:
   means for obtaining weather information from a weather information server;
   means for obtaining a subset of the weather information from the weather information; means for sending the subset of the weather information to a wireless device;
   means for determining whether any previously sent and expired weather information has been undelivered to the wireless device; and
   means for deleting the undelivered weather information.

19. A computer-readable medium having stored thereon instructions which, when executed by a processor, causes the processor to:
   obtain weather information from a weather information server;
   obtain a subset of the weather information from the weather information;
   send the subset of the weather information to a wireless device;
   determine whether any previously sent and expired weather information has been undelivered to the wireless device; and
   delete the undelivered weather information.

* * * * *